US012180721B2

(12) United States Patent
Bryant

(10) Patent No.: US 12,180,721 B2
(45) Date of Patent: Dec. 31, 2024

(54) MUD GOOSENECK AND CLEANING METHOD

(71) Applicant: Jerome Bryant, Crescent Lake, OR (US)

(72) Inventor: Jerome Bryant, Crescent Lake, OR (US)

( * ) Notice: Subject to any disclaimer, the term of this patent is extended or adjusted under 35 U.S.C. 154(b) by 330 days.

(21) Appl. No.: 17/697,517

(22) Filed: Mar. 17, 2022

(65) Prior Publication Data

US 2022/0298808 A1 Sep. 22, 2022

Related U.S. Application Data

(60) Provisional application No. 63/162,446, filed on Mar. 17, 2021.

(51) Int. Cl.
| | |
|---|---|
| *E04F 21/08* | (2006.01) |
| *E04H 17/16* | (2006.01) |
| *E04H 17/18* | (2006.01) |
| *F16L 43/00* | (2006.01) |

(52) U.S. Cl.
CPC ............. *E04F 21/08* (2013.01); *E04H 17/16* (2013.01); *E04H 17/18* (2013.01); *F16L 43/00* (2013.01)

(58) Field of Classification Search
CPC ................................ F16L 41/082; F16L 41/12
USPC ........ 138/109, 177; 285/139.1, 139.3, 143.1, 285/205–208, 219, 221
See application file for complete search history.

(56) References Cited

U.S. PATENT DOCUMENTS

| | | | | | |
|---|---|---|---|---|---|
| 3,729,217 | A | * | 4/1973 | Metcalf ................... | F16L 19/02 228/151 |
| 6,299,686 | B1 | * | 10/2001 | Mills ....................... | F04B 43/10 92/92 |
| 6,378,738 | B1 | * | 4/2002 | Speaker ................. | E04F 21/165 222/401 |
| 6,712,238 | B1 | * | 3/2004 | Mills ................... | E04F 21/1657 222/61 |
| 6,799,704 | B2 | * | 10/2004 | Carleton ............... | F04B 23/023 222/401 |
| 2014/0097212 | A1 | * | 4/2014 | Pineda .............. | B05C 17/00506 222/567 |
| 2015/0344016 | A1 | * | 12/2015 | Tarandek .............. | B60T 8/3685 285/27 |

* cited by examiner

*Primary Examiner* — Patrick F Brinson
(74) *Attorney, Agent, or Firm* — Dean A. Craine

(57) ABSTRACT

A gooseneck for filling drywall mud from a pump to a taping machine that attaches to a hose to deliver water to the taping machine's interior cavity during cleanup. In one embodiment, the gooseneck includes an upper pump plate with an inlet port with internal threads compatible with a threaded male hose connector. In another embodiment, a gooseneck is used with an adapter plate disposed between the gooseneck's upper pump plate and the pump's outlet port. The adapter plate includes two connector bores and a center entrance port with internal threads compatible with a male hose connector. When assembled, the bores and entrance port are axially aligned with connector holes or slots and the input port on the upper pump plate. Also disclosed is a method for cleaning the taping machine's interior cavity using one of the two embodiments and a garden hose that dispenses water into the taping machine.

5 Claims, 4 Drawing Sheets

MUD GOOSENECK AND CLEANING METHOD

This non-provisional patent application is based on U.S. provisional patent application (Application No. patent application 63/162,436), filed on Mar. 17, 2021.

Notice is given that the following patent document contains original material subject to copyright protection. The copyright owner has no objection to the facsimile or digital download reproduction of all or part of the patent document but otherwise reserves all copyrights.

BACKGROUND OF THE INVENTION

1. Field of the Invention

This invention pertains to tubular, goose neck-shaped conduits used to deliver drywall mud from a manual pump to an automatic taping machine, and more particularly to improved goose neck-shaped conduits that can be disconnected from the manual pump and selectively connected to a standard hose to deliver water to the automatic taping machine during cleanup.

2. Description of the Related Art

Automatic taping machines simultaneously apply a strip of drywall tape coated with a thin layer of drywall mud to a joint between adjacent drywall boards. Automatic taping machines include elongated tubular bodies with interior cavities filled with drywall mud, hereinafter called 'mud'. Located inside the interior cavity is a moveable plunger. Mounted on the upper end of the tubular bodies are head assemblies from which sections of tape and mud are simultaneously dispensed.

FIG. 1 is an illustration of an automatic taping machine 10 found in the prior art. The taping machine 10 is filled with mud mixed in a bucket 20. A manual pump 15 is vertically aligned over the bucket 20 and partially submerged into the mud 22. Attached to an upper port 17 formed on the pump 20 is a gooseneck-shaped conduit 24 (hereinafter called a 'gooseneck') with a curved upper end. Formed on the curved upper end is a flange connector 25 that connects to the pump's upper port 17. The upper end of the gooseneck 24 extends over the outside surface of the bucket 20. The gooseneck 24 also includes a U-shaped lower end with a vertical leg 26 that receives a mud filling tube18 that extends downward from the lower end of the automatic tape machine 10. When the pump 15 is activated, mud 22 flows from the pump 15 into the gooseneck 25, into the mud filling tube 18 and into an interior cavity 21 formed in the taping machine 10.

During use, rollers on the head assembly (not shown) are forced across the a joint between drywall boards, which simultaneously pulls and presses a strip of drywall table with a coat of mud over the joint. As the rollers rotate, an interior plunger (not shown) inside the interior cavity 21 moves downward and forces mud out of the interior cavity 21 and onto the inside surface of the drywall tape.

Because the mud dries and hardens relatively quickly (typically in one to two hours), the mud filling tube 18, the inner cavity 21, and the interior plunger must be thoroughly cleaned after each use. Heretofore, drywallers must disassemble the taping machine 10 using a garden hose to spray water over the exterior and interior parts. During cleanup, water must be sprayed at different angles to carefully remove all unused mud or partially dried mud particles. Unfortunately, dissembling the taping machine 10 and manually spraying water to the individual parts often covers surrounding objects (outdoor furniture, plants, etc.) and surfaces (lawns, patios, driveways, sidewalks, etc.) with white-colored mud.

What is needed is an improved gooseneck that delivers mud from a pump to an automatic tapping machine and allows a drywaller to attach a hose directly to the gooseneck to deliver water to the interior cavity in the automatic tape machine during cleanup.

During use, rollers on the head assembly (not shown) are forced across the joint between drywall boards, which simultaneously pull and presses a strip of drywall table with a coat of mud over the joint. As the rollers rotate, an interior plunger (not shown) inside the interior cavity 21 moves downward and forces mud out of the interior cavity 21 and, onto the inside surface of the drywall tape.

SUMMARY OF THE INVENTION

There is an improved gooseneck for filling drywall mud from a pump to an automatic taping machine. The gooseneck includes an upper pump plate configured to attach to the pump's output port. An inlet bore is formed on the upper pump plate through which mud is delivered. Formed on the lower end of the gooseneck is an output port that attaches to the tape machine's mud filling tube. The pump is manually activated during use, which fills the tape machine's interior cavity with mud. The taping machine is then lifted from the gooseneck and used.

When use of the automatic taping machine has ended, the drywaller is able to clean the taping machine without disassembling the entire machine and with minimal overspray of unused or dry particles. During cleanup, the drywaller detaches the goose neck's upper pump plate from the pump. In one embodiment of the gooseneck described herein, the inlet port formed on the goose neck's upper pump plate includes internal threads compatible with external threads on a water hose. The drywaller attaches a water hose to the upper pump plate and inserts the taping machine's mud filling tube into the gooseneck's output port. Water is then delivered to the water hose to flush out unused and dried mud from the automatic taping machine.

In a second embodiment, an adapter plate is selectively attached to the upper pump plate on the gooseneck after being detached from the pump's output port. A set of threaded connectors are used to securely attach the adapter plate to the upper pump plate. The adapter plate includes an inlet port with internal threads compatible with standard external threads on a water hose.

Using one of the two described embodiments, a method for cleaning the interior cavity formed in an automatic taping machine is disclosed.

DESCRIPTION OF THE PREFERRED EMBODIMENT(S)

Figure 1:
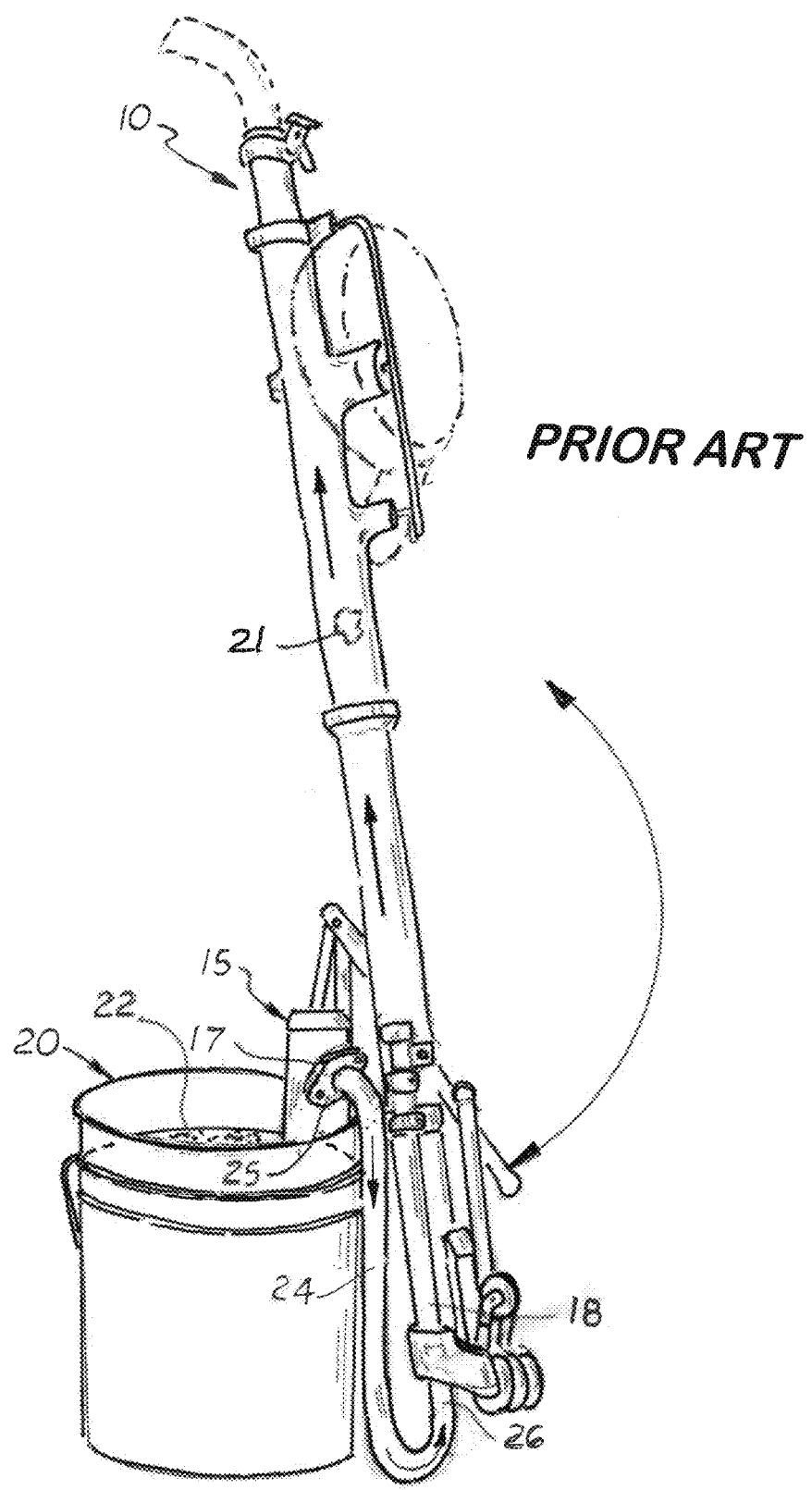
FIG. 1 is an illustration of an automatic taping machine vertically mounted on a gooseneck, with the gooseneck found in the prior art attached to a pump partially submerged into mud mixed in a bucket that delivers mud to the automatic taping machine.

Referring to the FIGS. 2-6, there are shown two improved goosenecks 30, 30' each used for filling drywall mud 22 from a pump 15 to an automatic taping machine 10 that allows the drywaller to attach a water hose 70 to the gooseneck 30, 30' to deliver water to the interior cavity (indicated by reference number '21' in FIG. 1) formed in the automatic taping machine 10 during cleanup.

Figure 2:
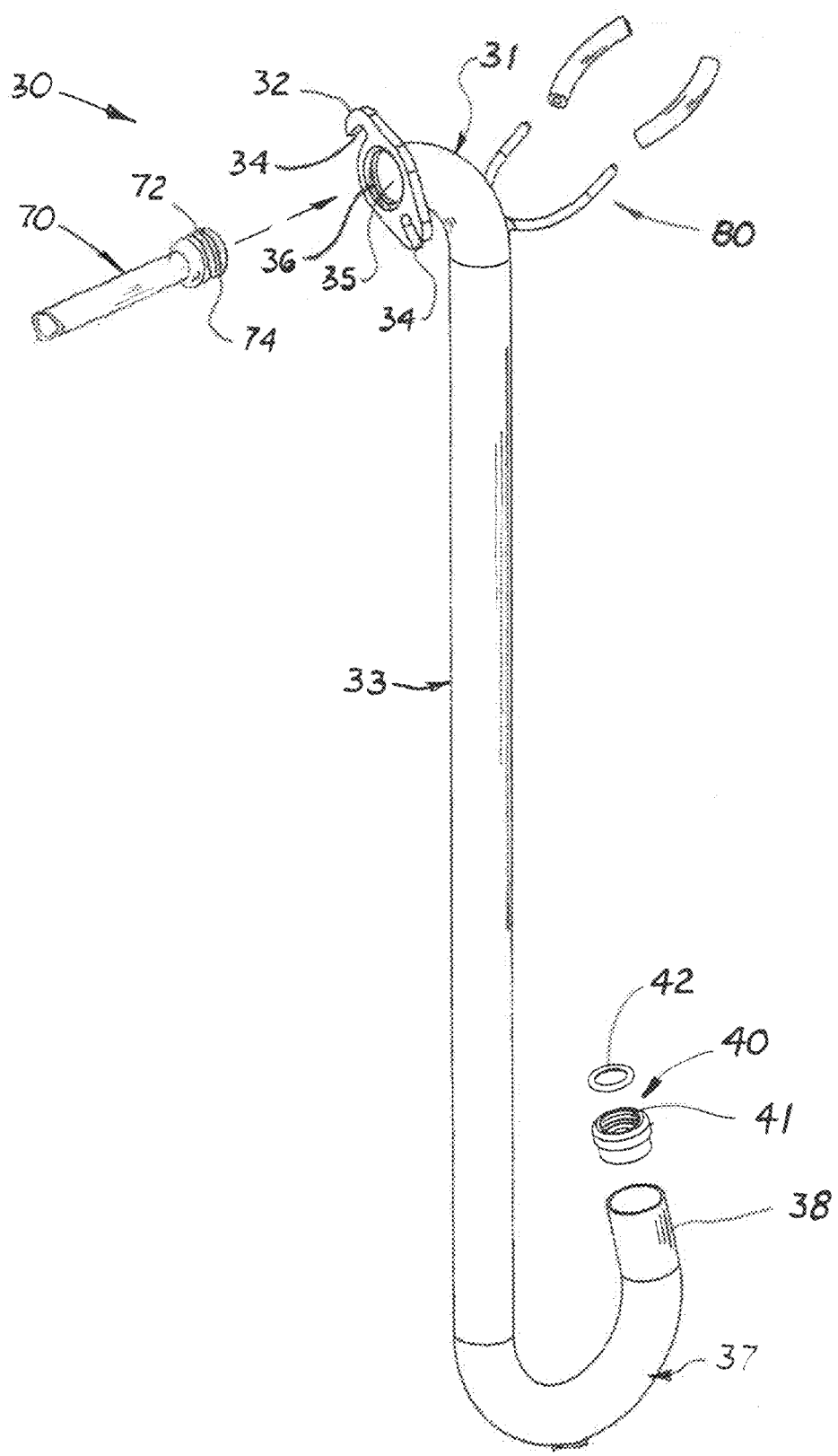
FIG. 2 is an exploded perspective view of the first embodiment of an improved gooseneck with internal threads formed on an inlet port compatible with external threads formed on a water hose fitting connector.

In the first embodiment, shown in FIG. 2, the improved gooseneck 30 is an elongated S-shaped tube with an over all shape and size similar to a gooseneck 24 found in the prior art shown in FIG. 1 and now incorporated herein. The improved gooseneck 30 includes an upper curved tube section 31, an elongated straight middle tube section 33, and a lower curved tube section 37. Formed or attached to the upper curved tube section 31 is an upper pump plate 32 with an inlet port 35 with internal threads 36 compatible with the external threads 74 on a standard threaded male hose connector 72 attached to a water hose 70. The upper pump plate 32 includes two side slots 34 in which threaded connectors (not shown) extend to attach the upper pump plate 32 to the output port 17 on the pump 15. Formed on the lower curved section 37 is an output port 38.

Figure 3:
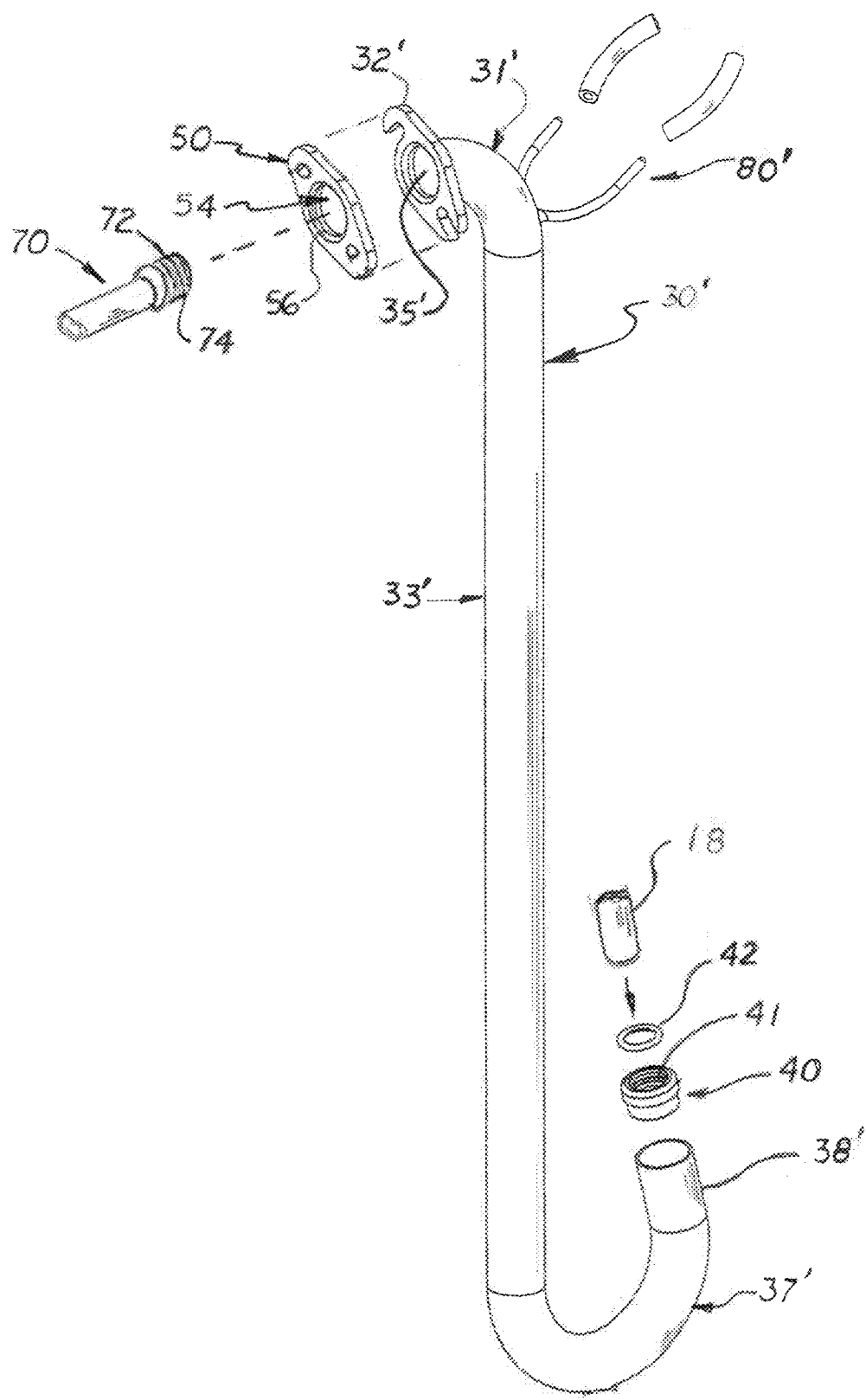
FIG. 3 is an exploded, perspective view of a second embodiment of an improved gooseneck with an adapter plate with internal threads formed on a center bore compatible with external threads formed on a water hose connector, the adapter plate includes side holes that receive threaded connectors to extend through the goose neck's upper flange plate to attach the adapter plate to the upper flange plate.

In a second embodiment, shown in FIG. 3, the improved gooseneck 30' includes an upper curved tube end section 31', an elongated straight middle tube section 33', and a lower curved tube section 37'. Formed or attached to the upper curved tube section 31' is an upper flange plate 32' identical to the upper flange plate 32 used in the first embodiment 30 but with a non-threaded inlet port 35'. The gooseneck 30' is distributed with an adapter plate 50, which is selectively attached to the upper flange plate 32', includes an entrance port 54 with internal threads 56 compatible with threads 74 on a standard threaded male hose connector 72 attached to a water hose 70. Formed on the lower curved section 37' is an output port 38'.

Figure 4:
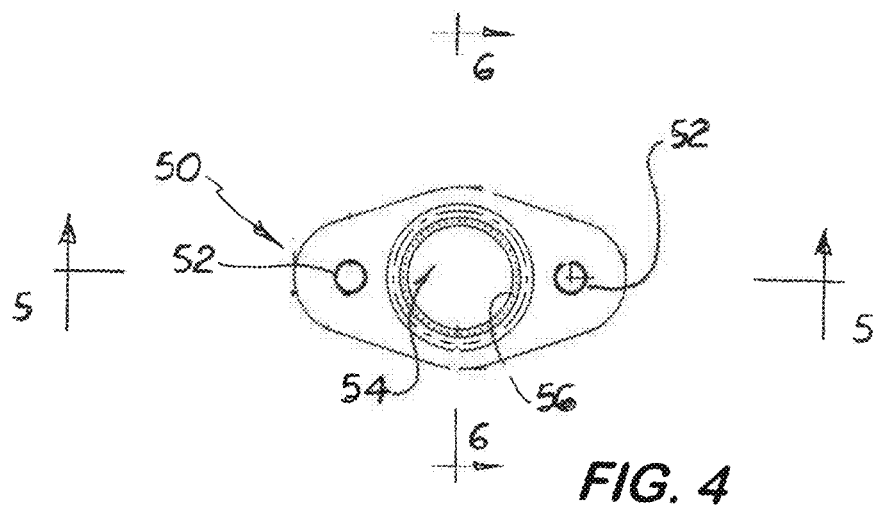
FIG. 4 is a top plan view of the adapter plate shown in FIG. 3.
Figure 5:
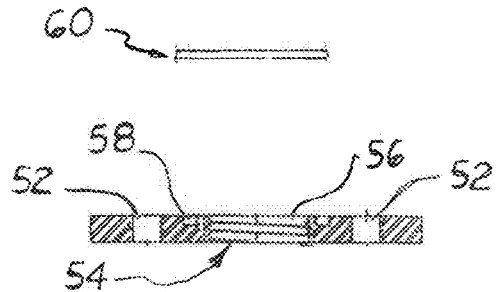
FIG. 5 is a sectional side elevational view taken along line 5-5 in FIG. 4.
Figure 6:
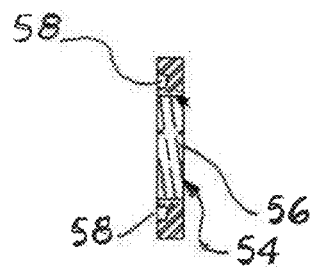
FIG. 6 is a sectional end elevational view taken along line 6-6 in FIG. 4.

FIG. 4 is a top plan view of the adapter plate 50 used with the gooseneck 30'. FIG. 5 is a sectional side elevational view taken along line 5-5 in FIG. 4 showing a washer 60 that fits into a washer slot 58 formed on one side of adapter plate 50. FIG. 6 is a sectional end elevational view taken along line 6-6 in FIG. 4.

FIG. 4 is a top plan view of the adapter plate 40 used with the gooseneck 30'. FIG. 5 is a sectional side elevational view taken along line 5-5 in FIG. 4 showing a washer 60 that fits into a washer slot 58 formed on one side of adapter plate 50. FIG. 6 is a sectional end elevational view taken along line 6-6 in FIG. 4.

Each gooseneck 30, 30' may include an optional female hose connector 40 with internal hose threads 41 and washer 42. The mud filling tube 18 fits into the connector's center bore. A male hose connector 70 may selectively attach to the connector 40 to force water into the pump 15 during cleanup.

The goosenecks 30, 30' may also include an optional bail 80, 80' used to attach the gooseneck to the pump 15 or to the mud taping machine 10.

Also disclosed herein is a method for cleaning the interior cavity formed in an automatic taping machine using one of the two embodiments and a garden hose that dispenses water.

In compliance with the statute, the invention described has been described in language more or less specific as to structural features. It should be understood, however, that the invention is not limited to the specific features shown, since the means and construction is shown, comprises the preferred embodiments for putting the invention into effect. The invention is therefore claimed in its forms or modifications within the legitimate and valid scope of the amended claims, appropriately interpreted under the doctrine of equivalents.

I claim:

1. An improved gooseneck configured to deliver drywall mud from a pump through a male hose connector to a mud filling tube attached to an automatic taping machine, the improved gooseneck, comprising:

an upper curved tube section, a straight middle tube section, and a lower curved tube section, attached or formed on said upper curved tube section is a pump plate with two bores that receive connectors that connect said upper curved tube section to said pump, said pump plate includes an inlet port with internal threads configured to attach to external threads on a male hose connector, said lower curved tube section includes a female hose connector that has a center bore configured to receive said mud filling tube attached to said automatic taping machine and internal threads configured to attached to a garden hose.

2. An improved gooseneck configured to deliver drywall mud from a pump to an automatic taping machine, the improved gooseneck, comprising;

an upper curved tube section, an elongated, a straight middle tube section, and a lower curved tube section, said upper curved tube section includes a pump plate with an inlet bore and two bores that receive connectors that connect the gooseneck to said pump; and an adapter plate configured to attached to said pump plate, said adapter plate includes two bores and an entrance port configured to be axially aligned with said bores and said inlet port on said upper curved tube section, said entrance port includes internal threads compatible with external threads formed on a hose connector.

3. The improved gooseneck as recited in claim 2, further including a female hose connector attached or formed on said lower curved tube section, said female hose connector includes a center bore configured to receive said mud filling tube attached to said automatic taping machine and internal threads configured to attached to a garden hose.

4. A method for delivering to and then cleaning mud from an automatic taping machine that includes a mud filling tube that extends downward from said automatic taping machine and connects to the output-port on a pump that includes an output port that delivers mud to said automatic taping machine, said method comprises the following steps:

a. selecting a gooseneck with an upper curved tube section, a straight middle tube section, and a lower curved tube section, attached or formed on said upper curved tube section is a pump plate with two bores that receive connectors that connect said upper curved tube section to said pump, said pump plate includes an inlet port with internal threads configured to attach to external threads on a male hose connector;
b. attaching said pump plate to said output port on said pump partially submerged in mud;
c. activating the pump to deliver mud via the gooseneck to said automatic taping machine;
d. deactivating said pump;
e. disconnecting said upper plate from said output port on said pump;
f. attaching a hose with a male hose connector with external threads to said bore formed on the upper plate; and
g. running a sufficient amount of water through said hose to clean said gooseneck and said automatic taping machine.

5. The method as recited in claim 4, further including an adapter plate attached to said pump plate, said adapter plate includes internal threads configured to attach to said male hose connector.

\* \* \* \* \*